United States Patent [19]

Ueoka et al.

[11] Patent Number: 5,219,657

[45] Date of Patent: Jun. 15, 1993

[54] POLYAMIDEIMIDE INSULATED WIRE

[75] Inventors: Isao Ueoka; Teruyuki Yamamoto, both of Osaka, Japan

[73] Assignee: Sumitomo Electric Industries Ltd., Osaka, Japan

[21] Appl. No.: 895,455

[22] Filed: Jun. 8, 1992

Related U.S. Application Data

[63] Continuation of Ser. No. 415,848, Oct. 2, 1989, abandoned.

[30] Foreign Application Priority Data

| Oct. 4, 1988 [JP] | Japan | 63-251558 |
| May 17, 1989 [JP] | Japan | 1-125396 |
| May 17, 1989 [JP] | Japan | 1-125397 |

[51] Int. Cl.⁵ .................. B32B 15/00; D02G 3/00
[52] U.S. Cl. ........................... 428/379; 428/375; 525/424; 525/436; 174/110 SR; 174/110 N
[58] Field of Search ............ 428/375, 379; 525/424, 525/436; 174/110 SR, 110 N

[56] References Cited

U.S. PATENT DOCUMENTS

| 3,779,996 | 12/1973 | Panze | 525/424 |
| 3,896,089 | 7/1975 | Noda et al. | 528/45 |
| 3,997,513 | 12/1976 | Noda et al. | 528/45 |
| 4,220,563 | 9/1980 | Hara et al. | 525/58 |
| 4,294,952 | 10/1981 | Mukoyama et al. | 174/110 SR |
| 4,505,980 | 3/1985 | Nishizawa et al. | 174/110 N |
| 4,530,975 | 7/1985 | Mukoyama et al. | 174/110 SR |
| 4,960,641 | 10/1990 | Hanaoka et al. | 428/379 |
| 4,997,891 | 3/1991 | Cicero et al. | 428/379 |

FOREIGN PATENT DOCUMENTS

| 7012985 | of 1970 | Japan | 525/436 |
| 74027680 | 7/1974 | Japan | 525/436 |
| 0204609 | 11/1984 | Japan | 525/424 |
| 02024908 | 1/1990 | Japan | 525/424 |
| 2104084 | 3/1983 | United Kingdom . | |

OTHER PUBLICATIONS

Database WPIL, accession No. 81-613200, Derwent Publications Ltd., Jul. 6, 1981.
Database WPIL, accession No. 87-232013, Derwent Publications Ltd., Jul. 11, 1987.

*Primary Examiner*—Patrick J. Ryan
*Assistant Examiner*—J. M. Gray
*Attorney, Agent, or Firm*—Sughrue, Mion, Zinn, Macpeak & Seas

[57] ABSTRACT

An insulated wire comprising a conductor coated and baked thereon with an insulating lacquer, the insulating lacquer comprising (a) 100 parts by weight of a polyamideimide resin having a molecular weight corresponding to a reduced specific viscosity of from 0.1 to 1.0, and (b) 75 to 400 parts by weight of a stabilized polyisocyanate compound derived from diphenylmethane-diisocyanate.

8 Claims, No Drawings

POLYAMIDEIMIDE INSULATED WIRE

This is a continuation of application Ser. No. 07/415,848 filed filed Oct. 2, 1989 now abandoned.

FIELD OF THE INVENTION

The present invention relates to an insulated wire which exhibits excellent solderability as well as high thermal resistance.

BACKGROUND OF THE INVENTION

Polyurethane-insulated wires are widely used for wiring and coils in electronic equipment because of their inherent solderability without exfoliation of the insulating film.

Recently, while increased miniaturization and performance of electronic apparatuses has resulted, increased thermal resistance in electronic components has been demanded because of high temperatures at which the electronic apparatuses are used.

Conventional polyurethane-insulated wires cannot meet the recent requirements for thermal resistance in some applications. In such applications, attempts have been made to use polyester-insulated wires and ester-imide-insulated wires.

The polyester-insulated wires or the ester-imide-insulated wires, however, are not solderable, although these wires satisfy the requirement for thermal resistance. As a result, users of these wires are compelled to choose thermal resistance or the easiness of end treatment (solderability). Therefore, an insulated wire having both thermal resistance and solderability has been demanded.

SUMMARY OF THE INVENTION

An object of the present invention is to provide an insulated wire which has both excellent solderability and high thermal resistance.

The above and other objects and effects of the present invention will be more apparent from the following description.

The above objects of the present invention are attained by an insulated wire comprising a conductor coated and baked thereon with an insulating lacquer, the insulating lacquer comprising 100 parts by weight of a polyamideimide resin having a molecular weight corresponding to a reduced specific viscosity of from 0.1 to 1.0, and 75 to 400 parts by weight of a stabilized polyisocyanate compound derived from diphenylmethane-diisocyanate.

DETAILED DESCRIPTION OF THE INVENTION

The present invention achieves an insulated wire with the high thermal resistance of polyimide resin that is solderable, by incorporating an appropriate amount of a stabilized polyisocyanate in polyamideimide resin.

Polyamideimide resins have previously been considered incapable of having solderability without impairing the thermal resistance even with the addition of a stabilized polyisocyanate. This is because the polyamideimide resin has high thermal resistance, and further it does not have a hydroxyl group that can react with the stabilized polyisocyanate to form urethane linkage that provides solderability.

The inventors of the present invention have achieved solderability with polyamideimide resin without impairing its thermal resistance by controlling the blending ratio and the type of the stabilized polyisocyanate blended to the polyamideimide resin.

The polyamideimide resin in the present invention is a polymer having both amide linkage and imide linkage in the molecule. It is prepared typically in two methods as below.

In one typical preparation method, at least one tricarboxylic anhydride chloride is reacted with at least one diamine. A portion of the tricarboxlylic anhydride chloride may be replaced by at least one dicarboxylic dichloride, at least one tetacarboxylic dianhydride, or at least one dicarboxylic dichloride with at least one tetracarboxylic dianhydride.

A portion of the diamine may be replaced by at least one triamine, at least one tetramine, or at least one triamine with at least one tetramine.

Examples of the tricarboxylic anhydride chloride include a 4-acid chloride of trimellitic anhydride, etc.

Examples of the dicarboxylic dichlorides include terephthalic dichloride, isophthalic dichloride, adipic dichloride, etc.

Examples of the diamines include 4,4'-diaminodiphenylmethane, 4,4'-diaminodiphenyl ether, m-phenylene diamine, etc. Examples of the triamines include 3,4,4'-triaminodiphenyl ether, etc. Examples of the tetramines include 3 3'4,4'-tetraaminodiphenyl ether, etc.

In another typical preparation method, at least one tricarboxylic anhydride is reacted with at least one diisocyanate. A portion of the tricarboxylic anhydride may be replaced by at least one dicarboxylic acid, at least one tetracarboxylic dianhydride, or at least one dicarboxylic acid with at least one tetracarboxylic anhydride.

Additionally, a portion of the isocyanate may be replaced by at least one trifunctional or higher functional polyisocyanate.

Examples of the tricarboxylic anhydrides include trimellitic anhydride, etc.

Examples of the dicarboxylic acids include isophthalic acid, terephthalic acid, adipic acid, etc.

Examples of the tetracarboxylic dianhydrides include pyromellitic dianhydride, benzophenonetetra-carboxylic acid dianhydride, etc. Examples of the diisocyanates include diphenylmethane-4,4'-diisocyanate, diphenyl ether-4,4'-diisocyanate, tolylene diisocyanate, xylylene diisocyanate, hexamethylene diisocyanate, etc.

Examples of the polyisocyanates include polymethylene-polyphenylene polyisocyanate, etc.

Polyamideimide resins derived from the reaction of an aromatic tricarboxylic anhydride or its derivative with an aromatic diisocyanate are preferable because of better manifestation of thermal resistance.

In the present invention, the polyamideimide resins have a molecular weight corresponding to a reduced specific viscosity of from 0.1 to 1.0. With the molecular weight of the resin corresponding to less than 0.1 in terms of the reduced specific viscosity, the resultant insulated wire has poor flexibility. With a molecular weight corresponding to more than 1.0, the productivity of the wire is lower because of excessive foaming of the film during the production of the insulated wires. The polyamideimide resins having a reduced specific viscosity of from 0.2 to 0.5 result in insulated wires having excellent characteristics that are easily produced.

In particular, resins having a reduced specific viscosity of about 0.3 are most preferred for providing the desired characteristics and operability.

The reduced specific viscosity in the present invention was measured at a concentration of 0.5 g of the polyamideimide resin in 100 ml of DMAC (dimethylacetamide) or NM₂P (2-methyl-2-pyrrolidone) as the solvent, at a temperature of 30° C.

The stabilized polyisocyanate derived from diphenylmethane diisocyanate used in the present invention may be any blocked compound prepared by blocking isocyanate groups of diphenylmethane diisocyanate singly, or of polyisocyanate derived from reacting diphenylmethane diisocyanate with a polyol, a polyamine, a polycarboxylic acid or the like, with a known blocking agent such as a phenol, an alcohol, a caprolactam, etc.

Specific examples of stabilized polyisocyanate with, blocked group are CORONATE 2503 (made by Nippon Polyurethane Co., Ltd.) which is prepared by blocking with a phenol a polyisocyanate derived from diphenylmethane diisocyanate and a polyol; and MILLIONATE MS-50 (made by Nippon Polyurethane Co., Ltd.) prepared by blocking with a phenol a diphenylmethane diisocyanate, etc.

In the present invention, the intended effect can be achieved only by use of the stabilized polyisocyanate derived from diphenylmethane diisocyanate.

For instance, it was found by the present inventors that use of a stabilized polyisicyanate derived from a polyol and tolylene diisocyanate will provide an insulating film poor in flexibility in spite of its high solderability; and use of a stabilized polyisocyanate derived from a trimer of tolylene diisocyanate and containing isocyanuric ring will not provide satisfactory solderability in spite of its high flexibility.

In the present invention, the stabilized polyisocyanate compound derived from diphenylmethane diisocyanate is added in an amount of from 75 to 400 parts by weight, preferably from 100 to 300 parts by weight, to 100 parts by weight of the polyamideimide resin. Less than 75 parts by weight of the compound will not provide solderability to the resultant insulated wire, while more than 400 parts by weight of the compound will provide less improvement of the thermal resistance of the resulting insulated wire and little flexibility of the insulating film.

The blending of an epoxy resin to the insulating film of the present invention will preferably improve the thermal softening properties and the cracking resistance of the insulated without impairing the solderability of the insulated wire. Other crosslinking agents are not preferred because use of a melamine resin does not provide any change in characteristics, and use of a phenol resin or an aliphatic polyimide resin raises the soldering temperature even though it improves these characteristics.

Examples of the useful epoxy resins include epoxides derived from bisphenols (such as bisphenol A, bisphenol F, bisphenol S, bisphenolbiphenyl, bisphenol-naphthalene, hydroquinone, resorcin, and catechol); epoxides derived from alcohols (such as ethylene glycol, propylene glycol, diethylene glycol, polyethylene glycol, butylene glycol, hexamethylene glycol, glycerin, trimethylolpropane, and trishydroxyisocyanuric acid); epoxides derived from amines (such as from hexamethylenediamine, ethylenediamine, phenylenediamine, diaminodiphenylmethane, diaminodiphenylsulfone, diaminodiphenyllpropane, naphthalenediamine, xylylenediamine, and isophoronediamine); epoxides derived from acids or acid anhydrides (such as from adipic acid, sebacic acid, dodecanedioic acid, terephthalic acid, isophthalic acid, trimellitic acid, butane tetracarboxylic acid, pyromellitic acid, benzophenone tetracarboxylic acid, and isocyanuric acid; epoxides derived from isocyanates such as diphenylmethane diisocyanate, toluene diisocyanate, hexamethalene diisocyanate, xylene diisocyanate, and naphthalele diisocyanate); epoxides derived from compounds having in the molecule a plural kinds of functional groups (such as from amino, alcoholic, phenolic, isocyanato groups, for example, ethanolamine, aminocaproic acid, hydorxybenzoic acid, aminophenol, and glycine).

Further, oligomers and polymers may be used which are derived by reacting the above epoxides with alcohols, phenols, acids, amines, or isocyanates.

Specific examples of the epoxy oligomers include Epikote #1001, #1004 #1007, and #1009 (made by Yuka Shell Epoxy Co., Ltd.) derived from bisphenol A and epichlorohydrin; and epoxy polymers such as Phenoxy PKHH (made by Union Carbide Corp.), and YP-50 (made by Thoto Kasei Co., Ltd.).

Among the epoxy resins, those having a bromine-substituted benzene ring in the molecules are preferable because of lower soldering temperature.

The use of a polymer derived from a reaction of an epoxy resin with an alcohol, a phenol, an acid, an amine, or an isocyanate is preferable because of the improved cracking resistance.

Preferable solvents for the insulating lacquer of the present invention ar combinations of a solvent for the polyamideimide resin such as NM₂P, DMAC, and DMF (dimethylformamide) with a diluent such as solvent naphtha, toluene, and xylene. However, a solvent used usually for baking lacquer may be used or partially used: such solvents include phenols, glycols, glycol ethers such as cellosolve, phenyl cellosolve, methyl cellosolve, glycosolve, methyl glycosolve, phenyl glycosolve, and cellosolve acetate; cyclohexanone, methy ethyl ketone, ethyl acetate, tetrahydrofuran, nitrobenzene, dioxane, furfral, sulforane, DMSO (dimethylsulfoxide), pyridine, aniline, diethyl carbonate, ethanol, methanol, butanol, and cyclohexanol.

In the insulating lacquer of the present invention, a metal salt of naphthenic acid or octenoic acid, or an amine (such as an alkyl amine or an imidazole) is preferably used as a curing catalyst if desired.

The addition of the above catalyst in an appropriate amount is preferable for eased of production and higher thermal resistance.

Additionally, to the insulating lacquer of the present invention, there may be added, within a range not to impair the characteristics of the invention, a thermoplastic resin such as a polyvinyl formal, a polyamide, am polyester, a polyurethane, a polyether, a polysulfone, a polyether-sulfone, and a polyether-imide; a thermosetting resin such as a melamine resin, a phenol resin, a polyester, a polyurethane, a polyester-imide, a polyamide-imide not mentioned above, a polyester-amide-imide, a polyimide, and hydantoin; a filler, a pigment, a dye, a surfactant, a lubricant, or an antioxidant.

The examples below are intended to illustrate the characteristics and advantages of the present invention without thereby limiting it in any way. The Reference example below describes the insulating lacquer used in comparative examples and examples.

REFERENCE EXAMPLE 1 (POLYAMIDEIMIDE INSULATING LACQUER)

192.1 g (1.0 mole) of trimellitic anhydride and 250.3 g (1.0 mole) of diphenylmethane-4,4'-diisocyanate were added to a mixed solvent consisting of 770 g of N-methyl-2-pyrrolidone and 330 g of solvent naphtha (Swazol #1000 supplied by Maruzen Petro-Chemical Co, Ltd.). The mixture was at 80° C. for 3 hours. Thereafter, the temperature was raised to 165° C. over 6 hours, and further reacted at this temperature for 2 hours to give a polyamide-imide insulating lacquer. The reduced specific viscosity was 0.51 to 0.54.

REFERENCE EXAMPLE 2 (POLYAMIDEIMIDE INSULATING LACQUER)

A polyamide-imide insulating lacquer was prepared in the same manner as in Reference example 1 except that the reaction was conducted at 80° C. for 3 hours, at rising temperature to 140° C. over 4 hours, and further reacted at 140° C. for 3 hours. The reduced specific viscosity was 0.38.

COMPARATIVE EXAMPLE 1

A general-purpose polyurethane lacquer (TPU 5155, made by Totoku Paint Co, Ltd.) was applied to a copper conductive wire having a diameter of 0.3 mm so as to give a film thickness of 0.020 mm, and was subjected to baking. Table 1 shows the general characteristics (structure, flexibility, and solderability) of the resulting polyurethane-insulated wire and the glass transition temperature of the insulating film.

COMPARATIVE EXAMPLE 2

A heat-resistant polyurethane lacquer (ATH-605, made by Auto Chemical Co, Ltd.) was used for preparation of an insulated wire and the characteristics were evaluated in the same manner as in Comparative Example 1. The results are shown in Table 1.

EXAMPLE 1

An insulating lacquer was prepared by mixing and dissolving 100 parts by weight of the resin content of the polyamideimide insulating lacquer of Reference example 1 with 200 parts by weight of Coronate 2503 made by Nippon Polyurethane Co., Ltd. (hereinafter simply referred to as Coronate 2503, a stabilized polyisocyanate derived from a polyol and diphenylmethane diisocyanate). An insulated wire was prepared with this insulating lacquer, and the characteristic thereof were measured in the same manner as in Comparative Example 1. The results are shown in Table 1.

EXAMPLES 2 AND 3

Insulated wires were prepared and the characteristics thereof were measured in the same manner as in Example 1 except that the added amounts of Coronate 2503 were 100 parts by weight (in Example 2) and 300 parts by weight (in Example 3) relative to the 100 parts by weight of the resin content of the polyamide-imide insulating lacquer. The results are shown in Table 1.

COMPARATIVE EXAMPLES 3 AND 4

Insulated wires were prepared and the characteristics thereof were measured in the same manner as in Example 1 except that the added amounts of Coronate 2503 were 50 parts by weight (Comparative Example 3) and 500 parts by weight (Comparative Example 4) relative to the 10 parts by weight of the resin content of the polyamide-imide insulating lacquer. The results are shown in Table 1.

EXAMPLE 4, AND COMPARATIVE EXAMPLES 5 AND 6

Insulated wires were prepared and the characteristics thereof were measured in the same manner as in Example 1 except that, in place of Coronate 2503, Millionate MS-50 (a stabilized polyisocyanate derived from diphenylmethane diisocyanate) was used in Example 4; Desmodur Ap Stable (a stabilized isocyanate derived from a polyol and tolylene diisocyanate, made by Sumitomo Bayer Urethane Co., Ltd.) was used in Comparative example 5); and Desmodur CT Stable (a stabilized isocyanate comprising isocyanuric ring, made by Sumitomo Bayer Urethane Co., Ltd.) was used in Comparative example 6. The results are shown in Table 1.

EXAMPLES 5 AND 6

Insulating lacquers were prepared by mixing and dissolving 100 parts by weight of the polyamideimide resin prepared in Reference Example 2, 150 parts by weight (in Example 5) or 300 parts by weight (in Example 6) of Coronate 2503, and 1 part by weight of dibutyltin laurate. The insulating lacquer was applied and baked on a copper conductive wire having a diameter of 0.3 mm so as to give a film thickness of 0.020 mm. The general characteristics of the resulting insulated wires are shown in Table 2. (For the purpose of comparison of the characteristics, the characteristics of the polyurethane-insulated wires of Comparative Example 1 and 2 are shown in Table 2.)

EXAMPLES 7 TO 12

Insulating lacquers were prepared in a manner similar to Examples 5 and 6 by mixing and dissolving 100 parts by weight of the polyamideimide resin prepared in Reference example 2, 150 parts by weight of Coronate 2503, 20 parts by weight of the material shown below for each Example, and 1 part by weight of dibutyltin laurate as the catalyst. Insulated wires were obtained in the same manner as in Examples 5 and 6.

Example 7: Epikote #828 (an epoxy resin supplied by Yuka Shell Epoxy Co., Ltd.).

Example 8: TEPIC (an epoxy resin supplied by Nissan Chemical Industries, Ltd.).

Example 9: PR-311 (a phenol resin supplied by Sumitomo Durez Co., Ltd.).

Example 10: Superbeckamine J-820 (a melamine resin supplied by Dainippon Ink and Chemicals, Inc.).

Example 11: Kelimide 600A (an aliphatic polyimide supplied by Nippon Polyimide Co., Ltd.).

Example 12: YPBB25AS11 (a bromine modified phenoxy resin supplied by Thoto Kasei Co., Ltd.).

The general characteristics of the resultant insulating lacquers are shown in Table 3.

TABLE 1

| | Comparative example 1 | Comparative example 2 | Example 1 | Example 2 | Example 3 | Comparative example 3 | Example 4 | Comparative example 4 | Example 5 | Comparative example 6 |
|---|---|---|---|---|---|---|---|---|---|---|
| Stabilized Polyisocyanate[1] | | | | | | | | | | |
| Kind | — | — | 2503 | 2053 | 2503 | 2503 | 2503 | MS-50 | Ap | $C_T$ |
| Amount (Parts) | — | — | 200 | 100 | 300 | 50 | 500 | 200 | 200 | 200 |
| Structure (mm) | | | | | | | | | | |
| Finished diameter | 0.341 | 0.341 | 0.341 | 0.340 | 0.340 | 0.341 | 0.336 | 0.340 | 0.337 | 0.340 |
| Conductor diameter | 0.299 | 0.299 | 0.300 | 0.300 | 0.299 | 0.299 | 0.300 | 0.299 | 0.299 | 0.300 |
| Film thickness | 0.021 | 0.021 | 0.021 | 0.020 | 0.021 | 0.021 | 0.018 | 0.021 | 0.019 | 0.020 |
| Flexibility (winding in own diameter) | good | good | good | good | good | good | poor | good | poor | good |
| Solderability | | | | | | | | | | |
| 410° C. | good | good | good | good | good | poor | good | good | good | poor |
| 450° C. | good | good | good | good | good | poor | good | good | good | poor |
| Glass transition temperature[2] (°C.) | 140 | 160 | 215 | 217 | 210 | 215 | 160 | 225 | 180 | 225 |

Remark
[1] The kinds of the stabilized polyisocyanates are abbreviated as follows:
2503: Coronate 2503, MS-50: Millionate MS-50
Ap: Desmodur Ap Stable
$C_T$: Desmodur CT Stable
Blending (parts) is amount for 100 parts by weight of the polyamide-imide resin.
[2] The glass transition temperature is a temperature of transition center measured by DSC (DSC-10 made by Seiko Electronics Co., Ltd.)

TABLE 2

| | Comparative example 1 | Comparative example 2 | Example 5 | Example 6 |
|---|---|---|---|---|
| Structure (mm) | | | | |
| Finished diameter | 0.341 | 0.341 | 0.344 | 0.340 |
| Conductor diameter | 0.299 | 0.299 | 0.300 | 0.300 |
| Film thickness | 0.021 | 0.021 | 0.022 | 0.020 |
| Flexibility (winding in own diameter) | good at own diameter | good at own diameter | good at own diameter | good at own diameter |
| Adherence flexibility (20% rapid elongation) | good at own diameter | good at own diameter | good at own diameter | good at own diameter |
| Unidirectional wear | 650 g | 680 g | 700 g | 670 g |
| Dielectric breakdown voltage, | | | | |
| Normal state | 9.3 kV | 9.0 kV | 8.5 kV | 7.8 kV |
| 220° C., 7 days | 3.0 kV | 5.3 kV | 7.1 kV | 6.7 kV |
| 240° C., 7 days | less than 0.5 kV | 0.6 kV | 5.6 kV | 5.1 kV |
| Heat shock, 200° C. | good at 5-times diameter | good at 3-times diameter | good at own diameter | good at own diameter |
| Heat softening temperature | 220° C. | 230° C. | 245° C. | 240° C. |
| Solderability, 410° C. | 1 sec | 1 sec | 3 sec | 2 sec |
| Glass transition temperature (DSC method) | 140° C. | 160° C. | 230° C. | 220° C. |

Remark
1) The above tests were conducted according to JIS C 3003 for coil test.
2) The glass transition temperatures were measured in the same manner as in Table 1.

TABLE 3

| Example No. | 5 | 7 | 8 | 9 | 10 | 11 | 12 |
|---|---|---|---|---|---|---|---|
| Added resin | none | Epicoat #828 | TEPIC | PR-311 | J-820 | Kelimide 600A | B25AS11 |
| Structure (mm) | | | | | | | |
| Finished diameter | 0.344 | 0.342 | 0.343 | 0.340 | 0.341 | 0.342 | 0.340 |
| Conductor diameter | 0.300 | 0.300 | 0.300 | 0.300 | 0.301 | 0.301 | 0.301 |
| Film thickness | 0.022 | 0.021 | 0.022 | 0.020 | 0.020 | 0.021 | 0.020 |
| Flexibility (winding in own diameter) | good | good | good | good | good | good | good |
| Unidirectional wear | 700 g | 750 g | 720 g | 710 g | 680 g | 720 g | 710 g |
| Dielectric breakdown voltage | 8.5 kV | 8.7 kV | 8.5 kV | 8.9 kV | 8.0 kV | 8.7 kV | 8.6 kV |
| Heat shock, 200° C. (wound in own diameter) | good | good | good | good | good | good | good |
| Heat softening temperature | 245° C. | 250° C. | 255° C. | 260° C. | 240° C. | 255° C. | 245° C. |
| Solderability, 410° C. | 3 sec | 4 sec | 3 sec | 10 sec | 3 sec | 8 sec | 1 sec |
| Glass transition temperature | 230° C. | 235° C. | 230° C. | 235° C. | 230° C. | 235° C. | 230° C. |
| Resistance to crazing (Pinholes at elongation in water) | about 10 | 1-2 | 2-3 | about 10 | about 10 | about 15 | none |

Remark
1) Resistance to crazing was tested by dipping a sample 1 meter in length, and pinholes were observed by stretching by 3%.
2) Other tests were conducted in the same manner as in Table 1 and Table 2.

REFERENCE EXAMPLES 3 TO 7

Polyamideimides were prepared by use of the same starting material as in Reference Example 1, and varying the reaction temperature and the reaction time. The polyamideimides had reduced specific viscosity of 0.07 (Reference Example 3), 0.13 (Reference Example 4), 0.31 (Reference Example 5), 0.85 (Reference Example 6), and 1.15 (Reference Example 7), respectively.

EXAMPLE 13

An insulating lacquer was prepared by mixing and dissolving 100 parts by weight of the resin content of the polyamide-imide insulating lacquer of Reference Example 1 with 200 parts by weight of Coronate 2503, and 1 part by weight of dibutyltin laurate. The resulting insulating lacquer was applied to a copper conductive wire having a diameter of 0.3 mm so as to give a film thickness of 0.020 mm, and subjected to baking. The result of the evaluation of the insulated wire are shown in Table 4.

COMPARATIVE EXAMPLE 7

An insulated wire was prepared and the characteristics thereof were evaluated in the same manner as in Example 13 except that the polyamideimide insulating lacquer used was that prepared in Reference Example 3. The evaluation results are shown in Table 4.

EXAMPLES 14 TO 16

An insulated wire was prepared and the characteristics thereof were evaluated in the same manner as in Example 13 except that the polyamide-imide insulating lacquers used were those prepared in Reference Example 4 (for Example 14), Reference Example 5 (for Example 15), Reference Example 6 (for Example 16), respectively. The evaluation results are shown in Table 4.

COMPARATIVE EXAMPLE 8

Preparation of an insulated wire was attempted in the same manner as in Example 13, except that the polyamideimide insulating lacquer prepared in Reference Example 7 was used. However, insulated wire could not be obtained because of generation of many foams in the film and break of the conductive wire.

The insulated wire of the present invention is as solderable as conventional polyurethane-insulated wires, so that the present invention is of great industrial value.

While the invention has been described in detail and with reference to specific examples thereof, it will be apparent to one skilled in the art that various changes and modifications can be made therein without departing from the spirit and scope thereof.

What is claimed is:

1. An insulated wire comprising a conductor coated and baked thereon with a solderable insulating lacquer, said solderable insulating lacquer comprising a blend of (a) 100 parts by weight of a polyamideimide resin having a molecular weight corresponding to a reduced specific viscosity of from 0.1 to 1.0, and (b) 75 to 400 parts by weight of a stabilized polyisocyanate compound; wherein said stabilized polyisocyanate compound is derived from blocking isocyanate groups of diphenylmethanediisocyanate singly or from reacting dipehnylmethanediisocyanate with a polyol to form a polyisocyanate and stabilizing with a blocking agent.

2. An insulated wire as claimed in claim 1, wherein said polyamideimide resin is derived from a reaction of an aromatic tricarboxylic anhydride or a derivative thereof with an aromatic diisocyanate.

3. An insulated wire as claimed in claim 1, wherein said insulating lacquer further comprises an epoxy resin.

4. An insulated wire as claimed in claim 3, wherein said epoxy resin is a brominated phenoxy resin.

5. An insulated wire as claimed in claim 2, wherein said insulating lacquer further comprises an epoxy resin.

6. An insulated wire as claimed in claim 1, wherein said polyamideimide resin has a molecular weight corresponding to a reduced specific viscosity of 0.2 to 0.5.

7. An insulated wire as claimed in claim 2, wherein said polyamideimide resin has a molecular weight corresponding to a reduced specific viscosity of 0.2 to 0.5.

TABLE 4

|  | Comparative example 7 | Example 14 | Example 15 | Example 13 | Example 16 |
|---|---|---|---|---|---|
| Molecular weight of polyamide-imide resin (reduced specific viscosity) | 0.07 | 0.13 | 0.31 | 0.51 | 0.85 |
| External appearance of insulated wire | good | good | good | good | wavy surface |
| Structure (mm) | | | | | |
| Finished diameter | 0.340 | 0.342 | 0.341 | 0.342 | 0.344 |
| Conductor diameter | 0.301 | 0.301 | 0.301 | 0.300 | 0.301 |
| Film thickness | 0.020 | 0.021 | 0.020 | 0.021 | 0.022 |
| Flexibility | good at twice diameter | good at own diameter | good at own diameter | good at own diameter | good at own diameter |
| Adherence flexibility (20% rapid elongation) | good at 4-times diameter | good at twice diameter | good at own diameter | good at own diameter | good at own diameter |
| Unidirectional wear | 620 g | 650 g | 700 g | 670 g | 660 g |
| Dielectric breakdown voltage | | | | | |
| Normal state | 7.2 kV | 8.1 kV | 8.8 kV | 8.5 kV | 8.6 kV |
| 240° C., 7 days | 4.3 kV | 5.2 kV | 6.1 kV | 6.2 kV | 5.8 kV |
| Heat shock, 200° C. | good at 3-times diameter | good at twice diameter | good at own diameter | good at own diameter | good at own diameter |
| Heat softening temperature | 220° C. | 235° C. | 245° C. | 245° C. | 245° C. |
| Solderability, 410° C. | 2 sec | 2 sec | 2 sec | 4 sec | 5 sec |
| Glass transition temperature | 220° C. | 225° C. | 229° C. | 227° C. | 230° C. |

Remark
1) The above tests were conducted according to JIS C 3003 for coil test.
2) The glass transition temperature is a temperature of transition center measured by DSC-10 made by Seiko Electronics Co., Ltd.)

As described above, the insulated film of the present invention has a higher glass transition temperature and improved thermal resistance in comparison with conventional insulated wires.

responding to a reduced specific viscosity of 0.2 to 0.5.

8. An insulated wire as claimed in claim 1, wherein said polyamideimide resin has a molecular weight corresponding to a reduced specific viscosity of about 0.3.

* * * * *